United States Patent
Peruggi et al.

[19]

[11] Patent Number: 5,808,246

[45] Date of Patent: *Sep. 15, 1998

[54] TRIAC DRIVE FOR THREE-PHASE LINE-POWERED LINEAR INDUCTION MOTOR ELEVATOR DOOR OPERATOR

[75] Inventors: Richard E. Peruggi, Glastonbury; Thomas M. McHugh, Farmington, both of Conn.; Edward E. Ahigian, Arlington Heights, Ill.; Jerome F. Jaminet, South Windsor, Conn.; Thomas He, Unionville, Conn.; Thomas M. Kowalczyk, Farmington, Conn.; Richard E. Kulak, Bristol, Conn.; David W. Barrett, Hartland, Conn.; Zbigniew Piech, East Hampton, Conn.

[73] Assignee: Otis Elevator Company, Farmington, Conn.

[*] Notice: The term of this patent shall not extend beyond the expiration date of Pat. No. 5,682,023.

[21] Appl. No.: 533,596

[22] Filed: Sep. 25, 1995

[51] Int. Cl.[6] ................................................ B66B 13/14
[52] U.S. Cl. ............................................. 187/316; 49/118
[58] Field of Search .................................. 187/316, 317, 187/289; 49/118, 120

[56] References Cited

U.S. PATENT DOCUMENTS

| | | | |
|---|---|---|---|
| 3,462,883 | 8/1969 | Reeks et al. | 310/12 |
| 3,624,471 | 11/1971 | Japp | 318/225 R |
| 3,708,915 | 1/1973 | Davey | 49/340 |
| 3,793,944 | 2/1974 | Grubich et al. | 100/53 |
| 3,855,529 | 12/1974 | Wright | 318/227 |
| 3,872,622 | 3/1975 | Berk | 49/360 |
| 3,891,907 | 6/1975 | Lenzkes et al. | 310/12 |
| 3,895,585 | 7/1975 | Schwärzler | 104/148 LM |
| 4,067,144 | 1/1978 | Ogishi | 49/360 |
| 4,090,113 | 5/1978 | Ogishi | 318/282 |
| 4,188,552 | 2/1980 | Brimer | 310/13 |
| 4,305,481 | 12/1981 | Hmelovsky et al. | 187/29 R |
| 4,323,835 | 4/1982 | Lee | 318/729 |
| 4,365,442 | 12/1982 | Speer | 49/346 |
| 4,434,394 | 2/1984 | Kellog et al. | 318/771 |
| 4,698,876 | 10/1987 | Karita | 16/102 |
| 4,858,452 | 8/1989 | Ibrahim | 70/264 |
| 4,876,765 | 10/1989 | Karita | 16/102 |
| 5,132,324 | 7/1992 | Sakagami et al. | 310/12 |
| 5,172,518 | 12/1992 | Yshino | 49/360 |
| 5,373,120 | 12/1994 | Barrett et al. | 187/316 |
| 5,382,023 | 1/1995 | McHugh et al. | 187/316 |
| 5,612,518 | 3/1997 | Jaminet et al. | 187/316 |

FOREIGN PATENT DOCUMENTS

| | | |
|---|---|---|
| 3264486 | 11/1991 | Japan . |
| 1148444 | 4/1969 | United Kingdom . |

OTHER PUBLICATIONS

"Linear direct drives featuring three–phase asynchronous motors", a brochure from Automation & Servo Technologies, Inc. a U.S. representative of Krauss Maffei AG.

*Primary Examiner*—Robert Nappi

[57] ABSTRACT

An electronic motor drive produces a required motion profile for an elevator door operator actuated by a three-phase, line-powered linear induction motor (LIM) by means of an array of TRIAC switches producing selected forces from the LIM. The TRIAC drive is capable of producing acceleration, deceleration or free coast in either the open or close direction of door operation. When controlled by an algorithm such as a "time-optimal switch point" or "bang-bang" control, the TRIAC drive produces the required motions from the linear induction motor for elevator door operation. The motor windings may be switchable between delta and wye hookups to provide two distinct thrust levels. Phase angle modulation may be used to provide finer control of thrust. The linear motor may be a 12-slot arrangement having four poles and three phases and arranged with flux emanating from the stationary primary (on the car) to a stationary backiron part of the secondary also mounted on the car, wherein the flux passes through a movable copper part of the secondary attached to the elevator door and passing between the primary and the backiron.

9 Claims, 9 Drawing Sheets

TRIAC DRIVE FOR THREE-PHASE LINE-POWERED LINEAR INDUCTION MOTOR ELEVATOR DOOR OPERATOR

TECHNICAL FIELD

This invention relates to elevators and, more particularly, to a linear motor for actuating an elevator door.

BACKGROUND OF THE INVENTION

A linear door motor system for elevators is disclosed in U.S. Pat. No. 5,373,120, assigned to Assignee hereof. That system used a linear motor control for controlling a rotational torque that varies with horizontal door movement (caused by a vertical force exerted vertically by the linear motor acting through a variable-length moment arm about the door's center of gravity). It counteracts this rotational torque on the door by varying the horizontal force for moving the door (caused by the linear motor acting through a fixed-length moment arm about the door's center of gravity). That motor control was eventually implemented by means of an electronic variable voltage/frequency motor drive that runs at 10–20 Hz and 0–170 volts and is highly effective, especially for high-performance elevator installations where a fast door open time (e.g., one second) is demanded and where high component cost can be tolerated, i.e., for the sake of high speed, reduction of noise (by eliminating the need for mechanical linkages driven by a rotary motor) and increased reliability.

The control strategy of U.S. Pat. No. 5,373,120 was, as shown in FIG. 13 thereof, to use a quasi-elliptical velocity profile. This was in contrast to the (simplified) "ramp up" and "ramp down" velocity profile of the prior art electromechanical door operator shown in FIG. 1 thereof. Naturally, it would be most advantageous to be able to use the linear motor concept for lower-cost elevators for the same reasons, i.e, replacing the old-style electromechanical door operator. However, the cost of the electronics, particularly the presently-implemented electronic variable voltage/frequency motor drive, puts this innovation out of reach for most new equipment installations.

DISCLOSURE OF INVENTION

An object of the present invention is to provide a linear door motor system for elevators using a different approach so that such a system can be widely used for many different types of elevator installations.

According to the present invention, a linear induction motor (LIM) control for providing drive current for driving a LIM according to a control strategy is responsive to alternating current (AC) at a fixed frequency as provided by a public utility, and comprises a plurality of switches connected at inputs thereof to said AC and at outputs thereof to phase windings of said LIM, the switches being responsive to control signals provided according to the control strategy for switching the phase windings to at least accelerate and decelerate the door. The switches may be TRIACs and the fixed frequency may be 50 or 60 Hertz.

In further accord with the present invention, the LIM comprises a primary mounted on the elevator and a two-part secondary comprising a steel plate first part mounted opposite a primary of the LIM also mounted on the elevator and a copper sheet second part mounted on the door and interposed between the primary and the steel plate. For purposes of the present invention, it should be realized that other LIM configurations are possible, such as having the LIM arranged as shown in U.S. Pat. No. 5,373,120, such as shown in copending application U.S. Ser. No. (Atty Docket OT-2144), such as the reverse of the above with the primary on the door and the secondary on the car, or many others.

In still further accord with the present invention, the control strategy is for alternately reversing two of the phase windings to correspondingly at least accelerate and decelerate the door. The switching can be selected to occur between a starting point from which the door is constantly accelerated to a switching point from which the door is constantly decelerated to a stopping point corresponding to a substantially full open or closed door. Or, the switching can be selected to occur between a starting point from which the door is constantly accelerated to a switching point from which the door is kept at a substantially constant velocity to a second switching point from which the door is constantly decelerated to a stopping point corresponding to a substantially full open or closed door.

These and other objects, features and advantages of the present invention will become more apparent in light of the detailed description of a best mode embodiment thereof, as illustrated in the accompanying drawing.

BEST MODE FOR CARRYING OUT THE INVENTION

Figure 1:
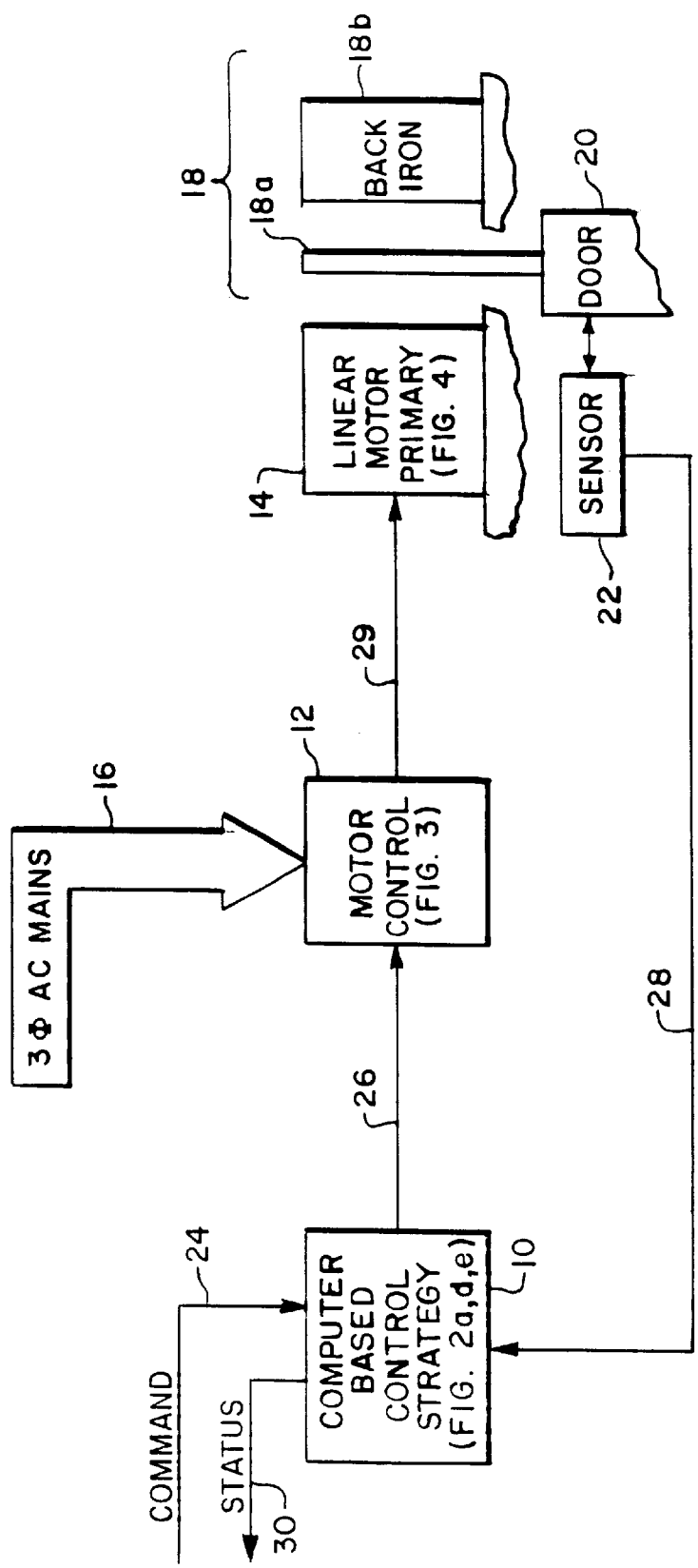
FIG. 1 shows a linear door motor system for an elevator, according to the present invention.

FIG. 1 shows a linear door motor system for actuating an elevator door, according to the present invention. It differs from the linear door motor system of U.S. Pat. No. 5,373, 120 in using a different motor orientation, a different computer control strategy 10, a different motor control 12 and a different linear motor primary 14, all of which have been selected and designed so as to make the concept more readily adaptable to elevator installations of all types, particularly lower-cost elevator installations.

Given that the single most expensive item in the implemented linear door motor system disclosed in U.S. Pat. No. 5,373,120 was the motor control shown in FIG. 4 thereof, the motor control was targeted as the single most important component in achieving a cost-effective linear induction motor (LIM) driven elevator door. The underlying idea of the present invention was to drive the linear motor primary 14 directly from the AC supply line 16, by means of the motor control 12 of the present disclosure, thereby eliminating the relatively expensive drive described above. However, such a configuration would not allow continuous control of the thrust output by the LIM. Nevertheless, by utilizing a time-optimal control strategy of bang/bang control in which the LIM is made to apply full thrust to accelerate the doors, or full thrust to decelerate the doors with the points of switching between accelerate and decelerate determined by a setting of switching curves, the desired powering of the LIM directly from the AC supply line is achieved. The motor control 12 can use TRIAC switches to accomplish the switching of the three-phase AC line 16. The linear motor primary 14 is designed and optimized to operate at the frequency of the AC mains, typically 50 or 60 Hz. This motor can be made of two or more poles and one or more, e.g., three phases. The LIM operates at high slip, so that it never approaches synchronous speed and, as such, has the characteristics of a forcer, producing an almost constant thrust over its entire normal operating envelope.

As described in more detail below, the motor control 12 connects the individual linear motor primary phase windings to the appropriate phase or phases of the incoming AC mains 16.

The linear motor primary 14 is fixedly mounted to the elevator cab, and a copper sheet part 18a of a linear motor secondary 18 is mounted to a movable elevator door 20 while a ferromagnetic backiron part 18b is mounted to the cab, such that thrust is applied to the movable door when the primary is energized. Door position and velocity are measured via a sensor 22, which may be implemented as a linear optical strip mounted on the movable door with a pickup on the cab.

As will be evident from FIG. 1, the linear motor has been oriented differently from the orientation shown in U.S. Pat. No. 5,373,120, where the primary was mounted above the door and the secondary was placed flat on the top edge of the door so that a perpendicular axis bridging the gap from the primary to the secondary is vertical. According to the illustration of FIG. 1 hereof, the motor is rotated ninety degrees so that the perpendicular axis bridging the gap from the primary to the secondary is horizontal, rather than vertical. It should be realized, however, that the invention hereof may be used with any linear motor arrangement for driving an elevator door.

A microprocessor may be employed to carry out the computer control strategy 10, to read the sensor 22 and to respond to a command signal on a line 24 from an elevator controller (not shown) for providing switching commands on a line 26 to the motor control 12. The computer control strategy 10 reads sensor signals on a line 28 from the sensor 22 and provides switching commands on the line 26 that result in current on a line 29 for full acceleration or reverse current for full deceleration, depending on pre-computed switch points, as described below.

The motor control 12, which may be implemented as a TRIAC electronic switch circuit, thus applies 50/60 Hz line voltage 16 on the line 29 to the linear motor primary 14 windings to effect the commanded thrust. Status information may be provided back to the elevator controller (not shown) on a line 30 from the computer control strategy 10.

Figure 2:
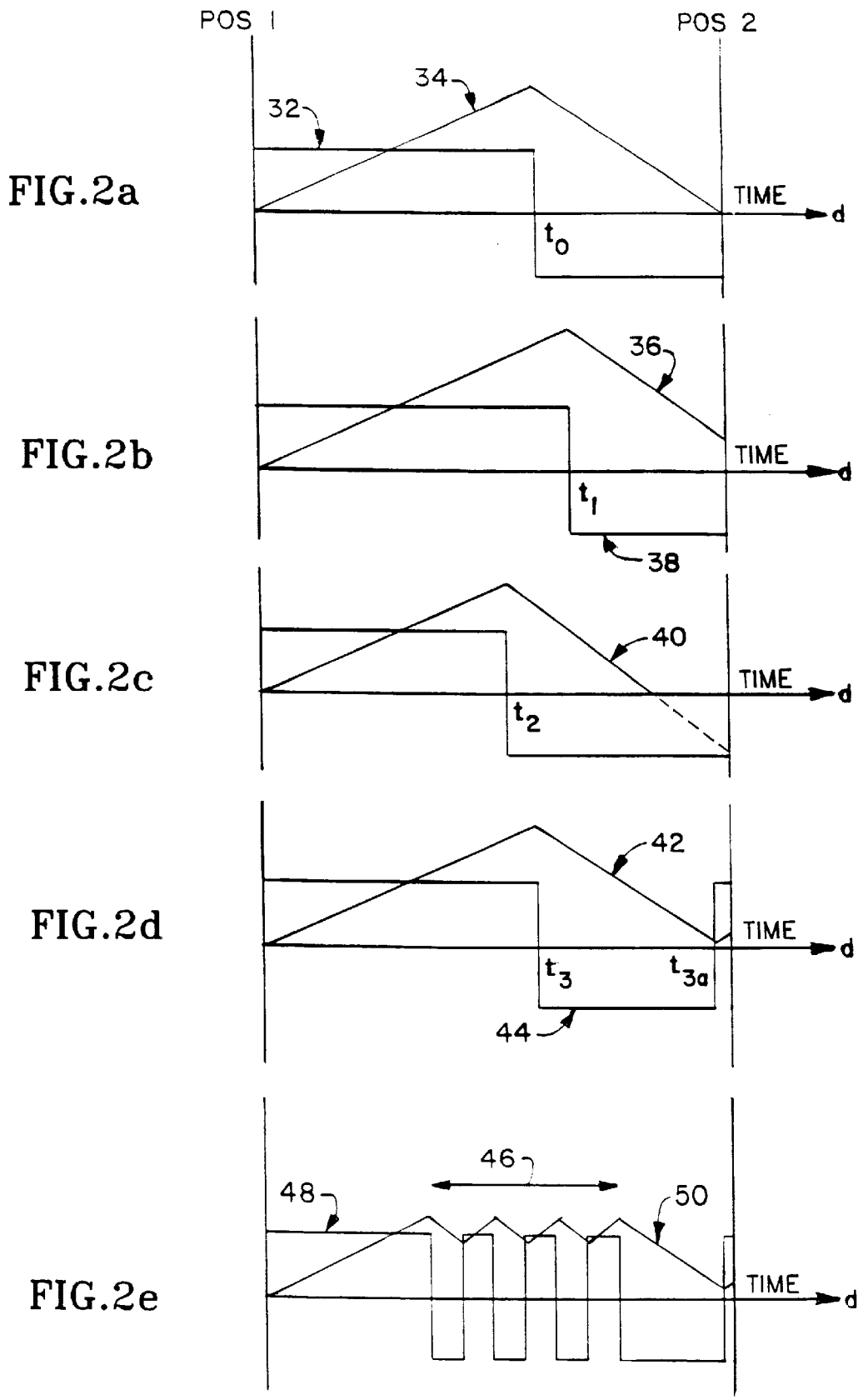
FIGS. 2a–2e show various instances of control strategies, some of which are optimal, according to the present invention.

As shown in more detail in FIGS. 2a–e, the control problem is to traverse the travel distance d in minimum time from a first position (POS1) with zero velocity to a second position (POS2) with zero velocity. The travel distance from POS1 to POS2 is known prior to the start of door motion. Door position can be measured by the sensor 22 of FIG. 1 and the velocity and/or acceleration derived therefrom. The theory of time-optimal control specifies a bang/bang control in which full acceleration, as indicated by an acceleration profile 32 in FIG. 2a, is applied until a predetermined switch point $spt_0$, after which full deceleration is applied. It may be assumed for purposes of the illustration that POS1 corresponds to a door closed position and POS2 a door open position. A velocity profile 34 corresponds to the acceleration profile 32. FIG. 2a therefore shows $spt_0$ as the time-optimal switch point, where the door reaches fully-open position at zero velocity, i.e., it exactly stops at that point. FIG. 2b shows a switch point $spt_1$ that is later than $spt_0$, so that the door still has a positive velocity at POS2, as indicated by a velocity profile 36, while still being decelerated as indicated by an acceleration profile 38 at the time of reaching POS2, at which point it crashes into the stop. Obviously, switch point $spt_1$ is not optimal and would not be a good selection.

FIG. 2c shows a case where the switch point $spt_2$ is earlier than $spt_0$, and the door reaches zero velocity as indicated by a velocity profile 40 before reaching the fully-opened position. Having thus stopped, it will begin going backwards if the drive isn't shut off. Similarly, switch point $spt_2$ is also not an optimal choice.

FIG. 2d shows another optimal case where a switch point $spt_3a$ is just slightly earlier than $spt_0$. As shown by a velocity profile 42, the door stops at a position $spt_{3b}$ just short of fully open. A second full acceleration is then applied to fully open the door through a controlled "crash" into the stop, as indicated by the velocity profile 42 and an acceleration profile 44.

FIG. 2e shows another optimal case with a pseudo-constant-velocity portion of travel 46 made up of short acceleration/deceleration bursts, as indicated by an acceleration profile 48. The decelerations Can be replaced by an "OFF" state (for a longer time period) with friction slowing the door down instead. As can be seen by a velocity profile 50, the velocity is somewhat choppy but relatively constant during the pseudo-constant-speed portion of travel 46.

Figure 3:
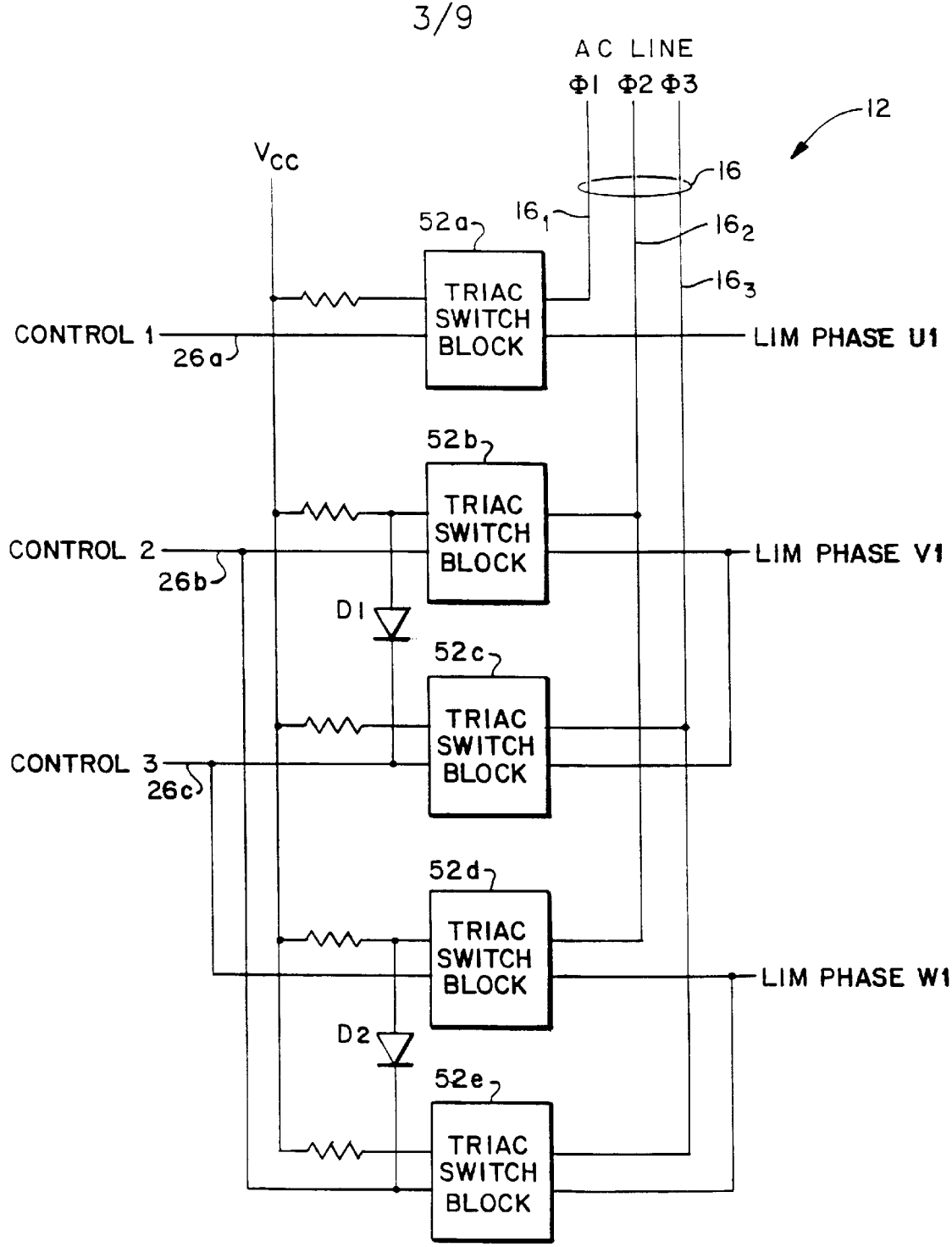
FIG. 3 shows a motor control, according to the present invention.

Turning now to FIG. 3, the motor control 12 of FIG. 1 is shown carried out using an array of TRIAC switches 52a–e to produce the desired forces from the linear motor. The TRIAC drive 12 is capable of producing acceleration, deceleration or coasting in either the open or closed direction of operation. When controlled by an algorithm such as a "time-optimal switch point" or "bang/bang" control strategy, such as shown in FIG. 2a, 2d or 2e, the TRIAC drive produces the required motions from the linear induction motor (LIM) 14 for elevator door operation.

The LIM 14 produces full thrust in a given direction (e.g., for accelerating an opening door or decelerating a closing door) when the three phase windings (motor coils) U, V, W of the LIM 14 are connected in a particular manner to the three phases of the AC line 16. The LIM 14 produces full thrust in a direction opposite to the given direction (e.g., for decelerating an opening door or accelerating a closing door) by reversing the connections of any two of the three motor phases to the AC line. On the other hand, disconnecting the phase windings from the AC line allows the LIM (along with the elevator door) to coast without producing thrust in either direction. The motor control or TRIAC drive 12 uses TRIAC switches 52a–e to accomplish the required switching function under the control of the computer control strategy 10 of FIG. 1 by means of control lines 26a, 26b, 26c.

Figure 4:
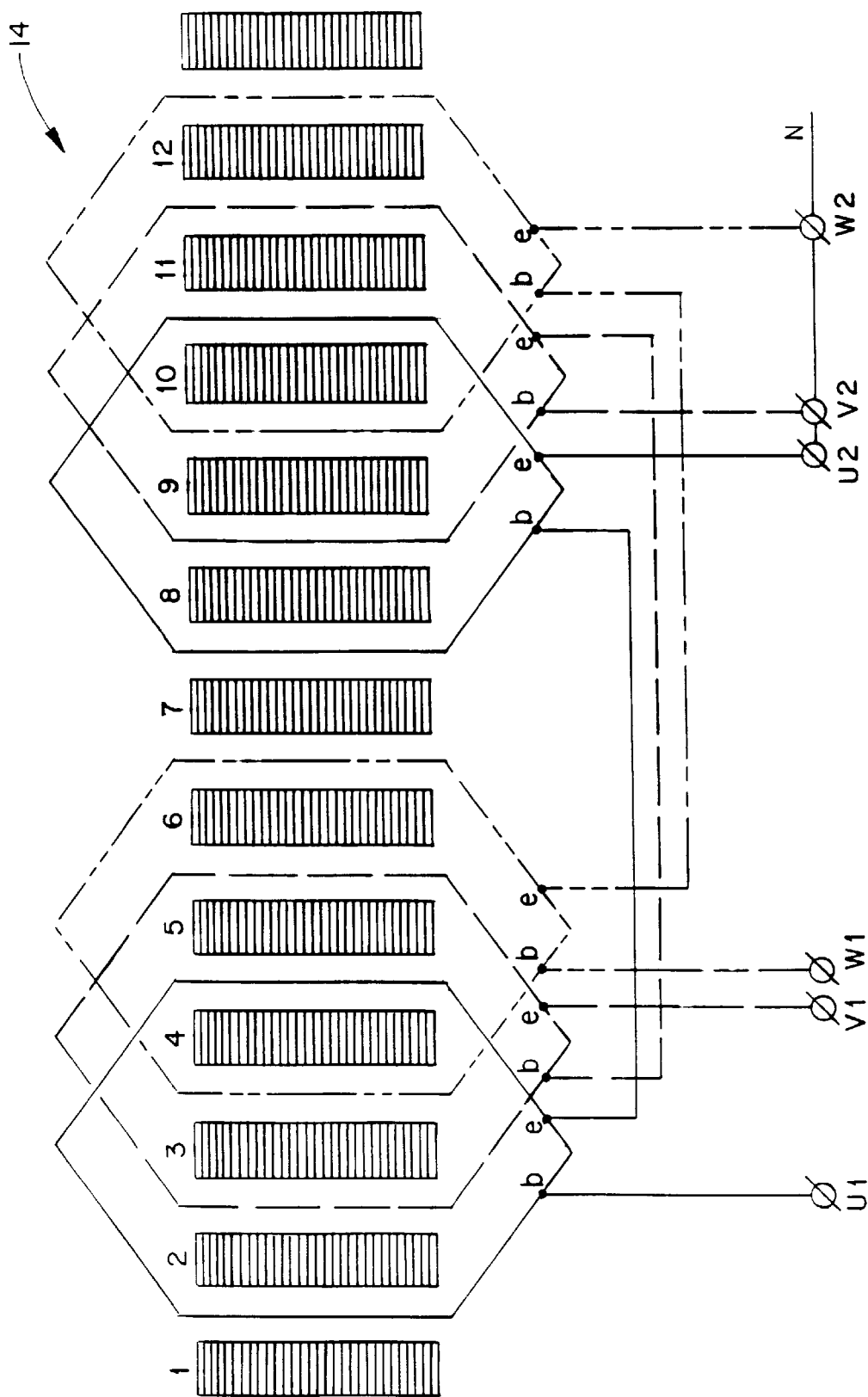
FIG. 4 shows a linear motor primary with a winding arrangement, according to the present invention.

FIG. 4 shows a winding pattern for a linear motor primary 14 implemented as a four-pole, three-phase primary. The wiring pattern illustrated is connected as a wye-connected three-phase winding, each winding spanning four slots with beginning (b) and ending (e) leads connected as illustrated. The U1, V1, W1 leads are connected to the corresponding U1, V1, W1 phase leads of FIG. 3 from the TRIAC switch blocks 52a, 52b, 52d, respectively. A particular embodiment of the linear motor primary 14 of FIG. 4 provides 95 Newtons of force using AWG 20 copper wire (0.813 mm outside dimension), wherein each coil shown in FIG. 4 has 220 turns. The overall length dimension for the primary of FIG. 4 is 170 mm, while the width is 64 mm. The overall height (perpendicular to the plane of the paper) is approximately 50 mm, while the slot length is 33 mm and is 8.6 mm wide.

The present invention is primarily concerned with the motor control 12 aspect of the linear door motor system disclosed herein for elevators. However, copending application S/N (Atty Docket No. OT-2033) addresses the linear motor 14, 18 of FIG. 1 itself in more detail, especially as shown in FIGS. 5–11 and described at page 10, line 31 through page 14, line 17, which is hereby incorporated by reference for background, and separately claims aspects thereof. Similarly, copending application S/N (Atty Docket No. OT-2114) discloses a dual secondary linear induction motor which could be used in lieu of the motor 14, 18 of FIG. 1 and which is hereby incorporated by reference for background, particularly to FIGS. 1–10 thereof described at page 4, line 8 through page 8, line 15. Other linear motors are usable as well, such as disclosed in U.S. Pat. No. 5,373,100 in connection with FIGS. 2 and 3 thereof, at column 4, line 27, through column 5, line 12, which is hereby incorporated by reference for background. Finally, copending application S/N (Atty Docket No. OT-2032) discloses in more detail (in FIGS. 5–10 thereof as described at page 10, line 9 through page 24, line 20 thereof, which is hereby incorporated by reference for background) the computer control strategy 10 of FIG. 1 and claims such separately.

The problem addressed by the system of FIG. 1 involves the need to electrically control a door operator that is powered by a linear induction motor (LIM) designed to be driven directly from the three-phase AC line 16. The LIM must be capable of producing controlled motion in both the forward and reverse directions. The drive 12 must be reliable, quiet and inexpensive. Typical mechanical (relay) controllers do not meet these requirements for noise and reliability.

An electronic motor control, according to the present invention, provides the required range of motion profiles such as shown in FIGS. 2a, 2d and 2e, for an elevator door operator actuated by the three-phase line-powered LIM. The motor control or drive 12 of the present invention uses an array of TRIAC switches such as shown in FIG. 3 to produce the desired forces from the LIM. The TRIAC drive is capable of producing acceleration, deceleration, or free coast in either the open or close direction of door operation. When controlled by an algorithm such as a "time-optimal switch point" or "bang-bang" control, coupled with a velocity regulator, the TRIAC drive produces the required motions from the LIM for elevator door operation.

The LIM produces full thrust in a given direction (e.g., for accelerating an opening door or decelerating a closing door) when the three-phase windings (motor coils) of the LIM are connected in a particular orientation to the three phases of the AC line. The LIM produces full thrust in the opposite direction (e.g., for decelerating an opening door or accelerating a closing door) by reversing the connections of any two of the three motor phases to the AC line. Disconnecting the motor phase windings from the AC line allows the LIM (along with the elevator door) to coast without producing thrust in either direction. The TRIAC drive uses TRIAC switches to accomplish the required switching function.

Figure 5:
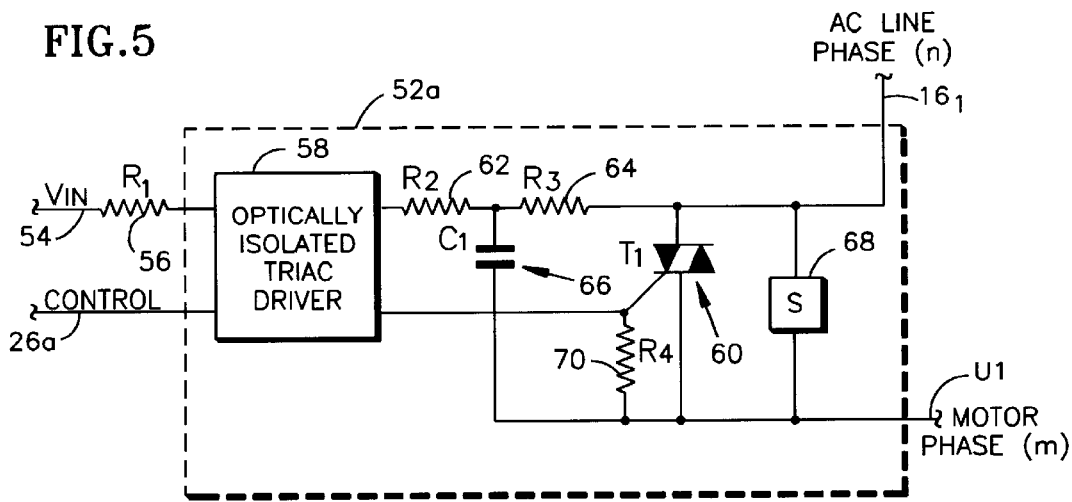
FIG. 5 shows a TRIAC switch as implemented for control by a microprocessor.

FIG. 5 shows the TRIAC switch 52a of FIG. 3 in more detail, as implemented for control by a microprocessor such as may be contained within the computer control strategy block 10 of FIG. 1. It should be realized that although the use of TRIAC switches is disclosed herein, the principles of the present invention may be carried out using any appropriate switch such as two anti-parallel silicon controlled rectifiers, among others. The TRIAC switch 52a of FIG. 5 is shown implemented as an optically isolated TRIAC switch controlled by the control output on the line 26a from the control logic or microprocessor of the computer control strategy block 10 of FIG. 1. When the control signal on the line 26a is driven to ground by the logic or microprocessor of the block 10 of FIG. 1, electrical current flows from a voltage source ($V_{in}$) on a line 54, through a current-limiting resistor ($R_1$) 56 and to an optical isolator 58. The optical isolator 58 provides electrical isolation between the control electronics in the block 10 of FIG. 1 and the high-voltage AC circuitry of the motor control block 12. Other isolation elements, such as solid-state or electromechanical relays or electronic switching circuits may also be used for this purpose. The optically isolated TRIAC driver 58 includes a photodiode or phototransistor switch which controls a TRIAC gate drive circuit which is switched "on" in response to current flow in the optical isolator 58. This gate drive function can also be achieved with discrete components, but the TRIAC driver is used for convenience. The TRIAC driver switches gate current "on" to a TRIAC ($T_1$) 60 by conducting current from the AC line phase on a line 16$_1$ (as also shown in FIG. 3) through a current-limiting resistance (here supplied by the combination of resistors 62, 64 ($R_2$, $R_3$) to the gate of the TRIAC. This turns the TRIAC "on", providing a very low resistance path for electrical current to flow from the AC line phase, through the TRIAC, to the motor phase winding (U1). A capacitor ($C_1$) 66 can optionally be used as a snubber to protect the TRIAC driver from switching transients. Likewise, a block (S) 68 is an optional snubber circuit which can comprise a capacitor and resistor in series and that can be used to protect the TRIAC itself from switching transients. Another optional component, a resistor ($R_4$) 70, can be used to vary the sensitivity of the TRIAC gate. Once triggered, AC current will flow through the TRIAC as long as gate current continues to be applied. When the gate current is removed, current continues to flow until the AC voltage of the particular line phase goes to zero, at which point the TRIAC switches off.

Figure 6A:
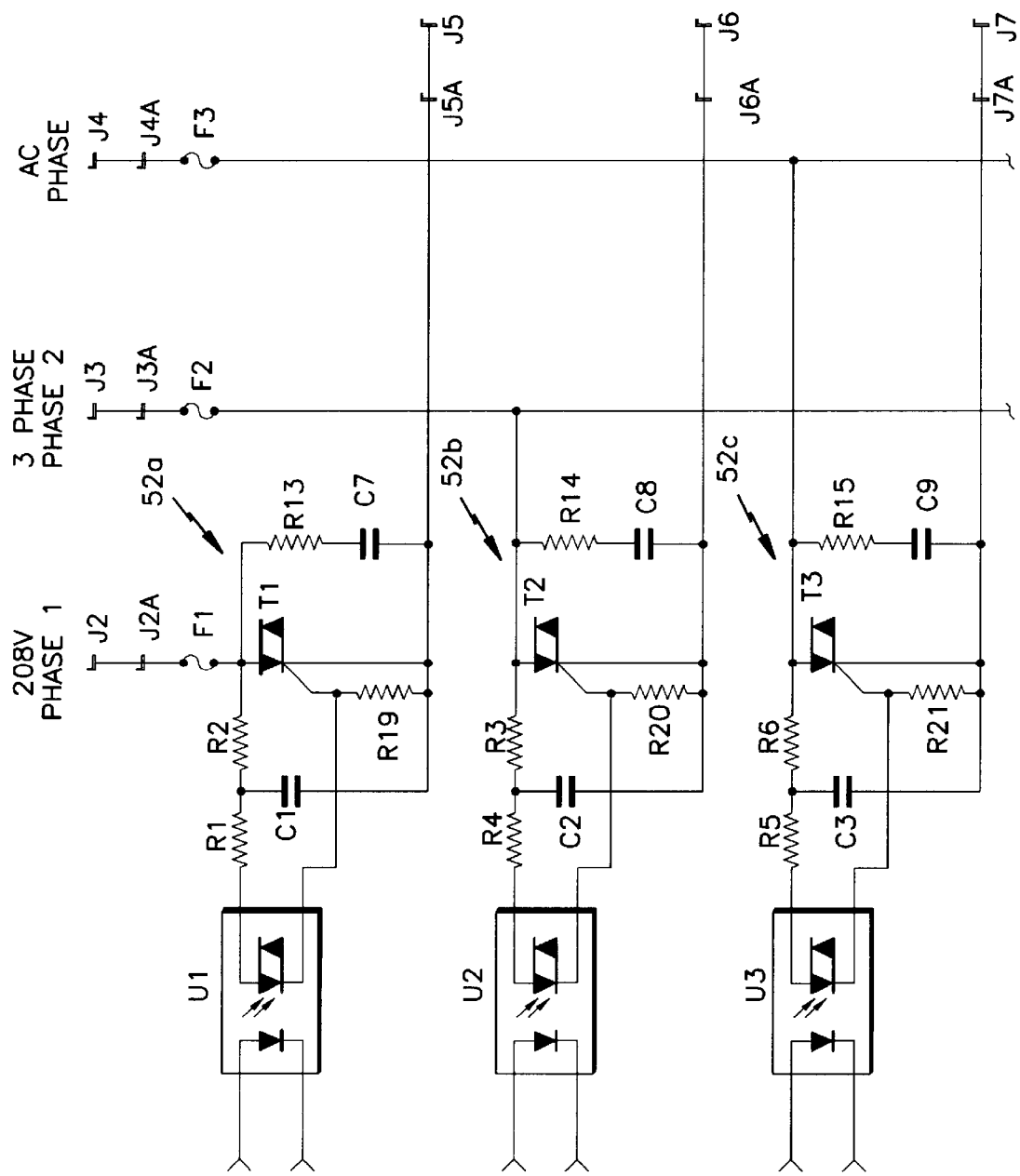
FIG. 6 shows the relation between FIGS. 6a, 6b and 6c, which together show a motor control such as shown in FIG. 3 in detail, using TRIAC switches according to FIG. 5.
Figure 6:
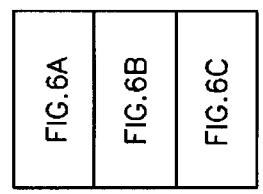
Figure 6B:
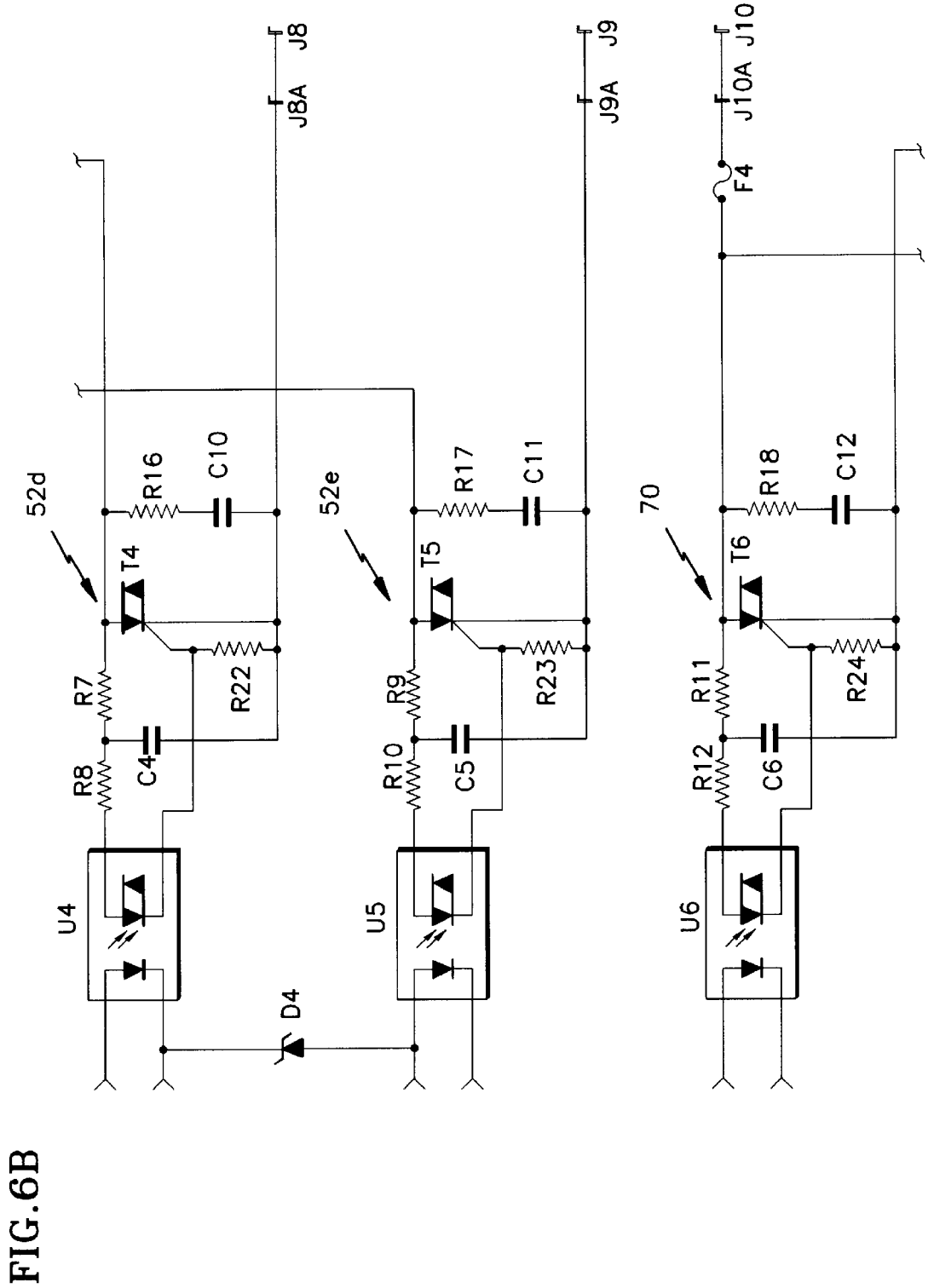
Figure 6C:
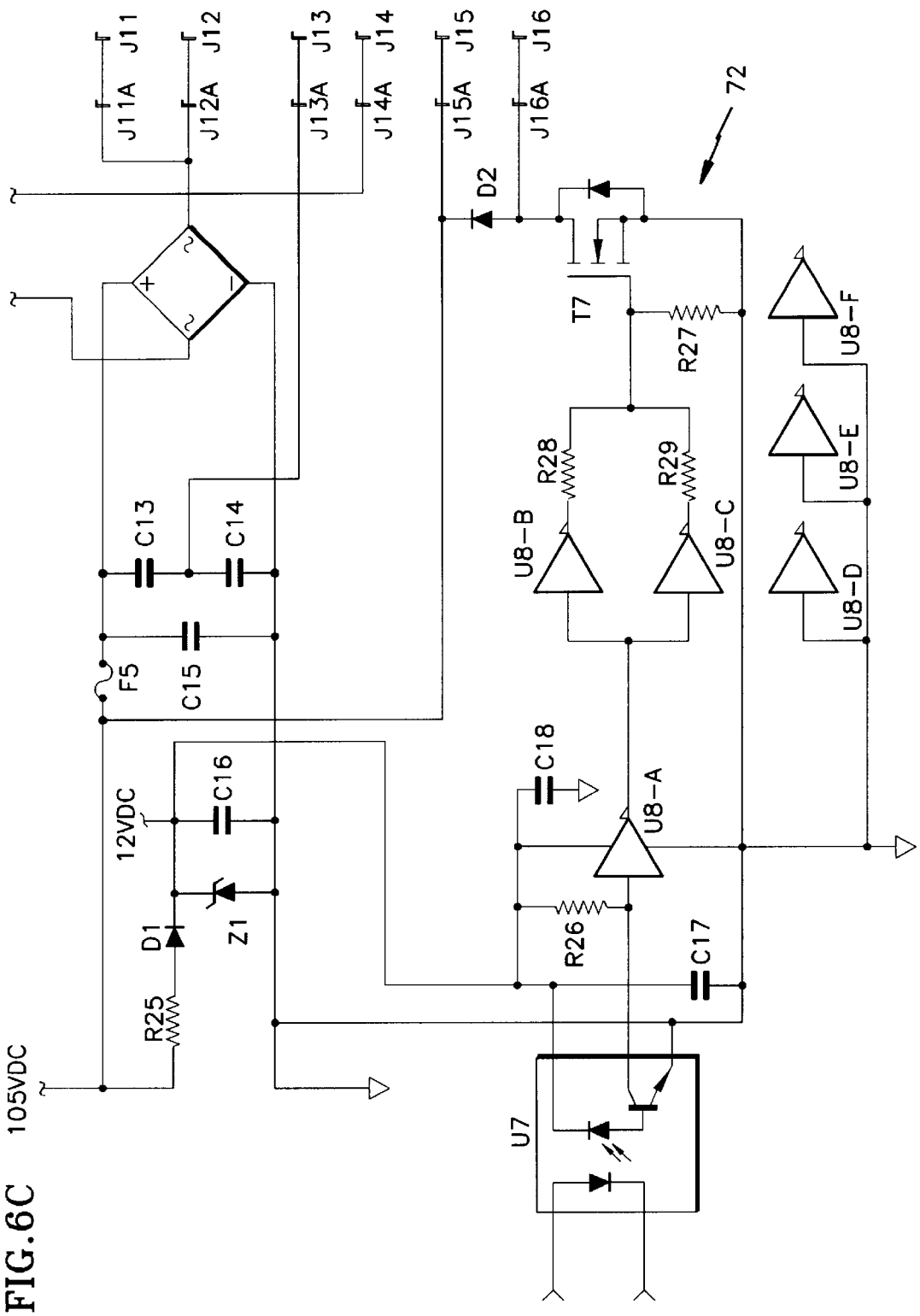

FIGS. 6A, 6B and 6C fit together as shown in FIG. 6 and together show the motor control 12 of FIGS. 1 and 3 in more detail. As can be seen in FIG. 6A, the TRIAC switch blocks 52a, 52b, 52c, and in FIG. 6B, the TRIAC switch blocks 52d, 52e, are shown implemented in detail according to the above-discussed details of FIG. 5. FIG. 6B shows in a lower portion thereof, a circuit 70 which represents an additional AC switch, and FIG. 6C shows a circuit 72 which represents a DC switch. These circuits 70, 72 may be used to energize an AC or DC (respectively) solenoid for the purpose of providing an electrical control means available to brake the door with an electromechanical braking device (not shown), or to control another electromechanical device (not shown) that couples the elevator car door to the hoistway door.

Referring back to FIG. 3, a description of the forward/reverse TRIAC switch arrangement operation follows. As described previously in connection with FIGS. 3 and 4, the LIM may comprise a three-phase motor with the motor phases being arbitrarily designated as phases U, V and W, and which can be connected in either a wye or delta configuration. It is, of course, noted that the designations of phase 1, phase 2 and phase 3 in FIG. 3, as well as their relation to the LIM phases U1, V1 and W1, are completely arbitrary. The LIM is driven in one direction by applying (driving to ground) control lines 26a, 26b, which results in LIM phase U being connected to AC line phase 1, phase V to phase 2, and phase W to phase 3. The LIM can supply thrust in the opposite direction by applying control lines 26a, 26c, resulting in LIM phase U being connected to AC line phase 1, phase V to phase 3, and phase W to phase 2. The diodes D1 and D2 prevent the TRIACs from shorting AC line phase 2 to phase 3 in the event that both control lines 26b and 26c are inadvertently turned "on" at the same time. If control lines 26b, 26c were both turned "on" at the same time, the arrangement of the two diodes would result in both LIM phases V and W being connected to the same AC line phase (shown here as phase 3), inhibiting door motion as well as preventing the shorting of the AC line phases. When all three control lines 26a, 26b, 26c are turned "off", no electrical power is applied to the LIM, which will then coast, slowing down due to frictional losses.

As will be appreciated, this arrangement of TRIAC switches allows the door to be controlled by means of a simple control mechanism. As implemented, the control comprises an algorithm contained within the computer control strategy block 10 of FIG. 1, which may be implemented as a microprocessor with software, as disclosed in copending S/N (Atty Docket OT-2032). This algorithm uses control loop position (and closed loop velocity derived from the position feedback) to control the state of the TRIAC switches. A set of electrical or electromechanical switches at appropriate positions along the path of door travel could accomplish a similar function but would not be robust. The microprocessor implementation of the control strategy accelerates the door in the desired direction of travel, until either a desired velocity is reached or until a point is reached at which the door must begin to decelerate to stop at the desired point. The acceleration and deceleration is controlled by setting the appropriate state of the control lines 26a, 26b, 26c of FIG. 3. A constant velocity state is achieved by either alternately switching from an acceleration condition to a deceleration condition, or switching between acceleration and coast conditions, at a frequency typically between two and twenty times per second, which maintains the door speed within a velocity band that approximates a constant speed. At the end of travel, the control maintains the door velocity at a sufficiently low level that the door can contact a mechanical stop to terminate travel.

The basic TRIAC switch block as shown in FIG. 5 can be used in various other arrangements to achieve additional LIM control modes of operation. The basic accelerate-coast or accelerate-decelerate technique of running at a constant velocity can be improved upon by adding TRIAC switches to both sides of each of the motor windings, such that not only can the phase connections be reversed, as before, but now the motor windings themselves can also be connected as either a wye or as a delta configuration. Such a setup produces two discrete thrust levels in each direction, as well as the coast or "off" state. This allows the control to add a high thrust-low thrust state to control constant speed.

Figure 7:
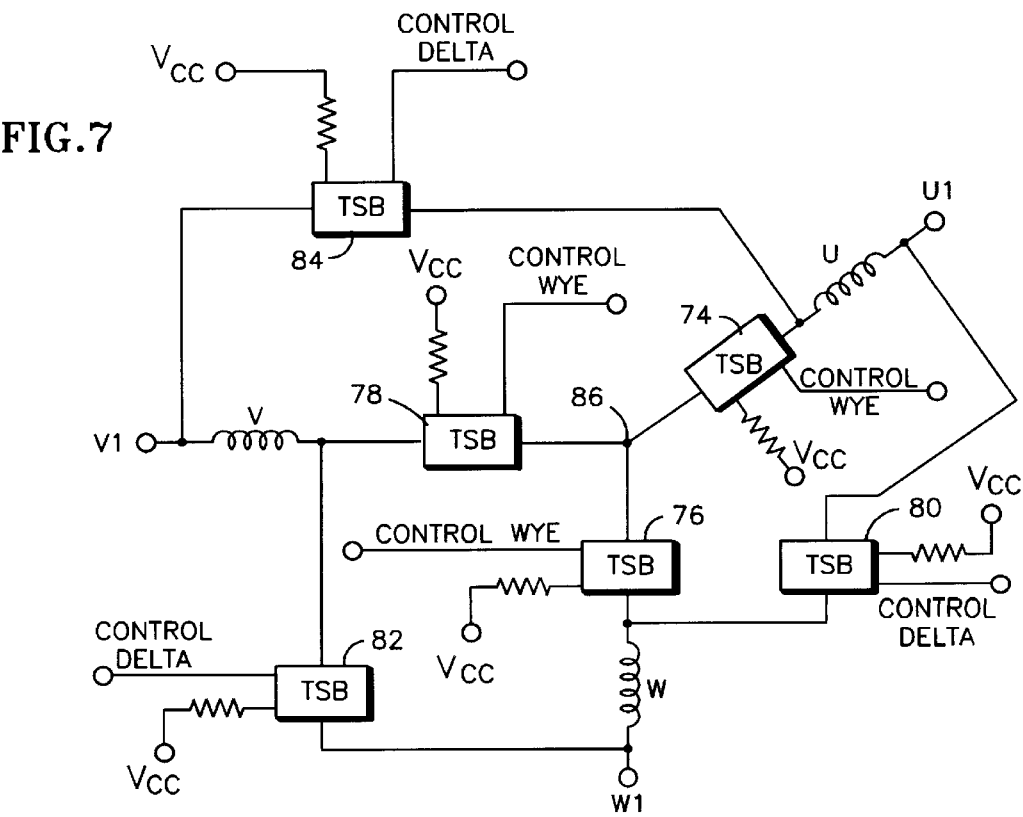
FIG. 7 shows a delta-wye connection, according to the present invention.

For instance, FIG. 7 shows a plurality of switches 74, 76, 78, 80, 82, 84, each of which may be similar to the TRIAC switch shown in FIG. 5 for controlling the hookup of three motor windings U, V, W, according to a control signal "control delta" or "control wye". Terminals U1, V1, W1 of the windings U, V, W will be hooked up to the TRIACs 52a–52e of FIG. 3, as before.

As suggested above, the intent of the "delta-wye" controllable hookup is to allow the coils of the motor, such as the linear induction motor primary windings of FIG. 4, to be connected in either a "delta" or a "wye" configuration, under the control of the computer control strategy block 10 or the elevator controller (which may incorporate the computer control strategy or be separate therefrom). The impedance of the motor will change depending on whether it is connected as a "delta" or "wye". This will alter the current flowing through the motor coils, causing different thrust or force levels (for a linear motor) or different torque levels (for a rotary motor) to be produced by the motor. Although six switches 74, 76, 78, 80, 82, 84 are shown in FIG. 7, five can be adequately used for this purpose. One of the switches 74, 76 or 78 can be optionally eliminated, replaced by a hard-wired connection, since the combination of the other two switches being turned off effectively isolates the third coil.

Figure 8:
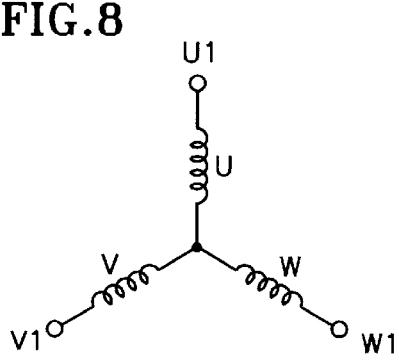
FIG. 8 shows the switches of FIG. 7 used for a wye hookup, according to the present invention.

When the "control wye" control line is activated, one side of each of the three motor coils is connected to a common point 86, setting the coils in a "wye" configuration, with the other side of each coil connected to the appropriate linear induction motor phase, as shown in FIG. 8, to the appropriate linear induction motor phase drive output from the motor drive 12.

Figure 9:
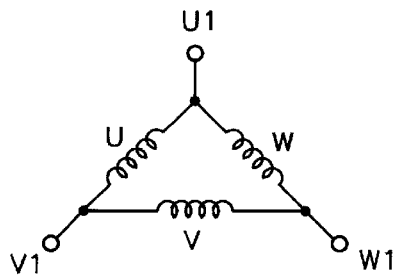
FIG. 9 shows the switches of FIG. 7 used for a delta hookup, according to the present invention.

When the "control delta" control line is asserted, the coils are hooked up as shown in FIG. 9, and each side of each motor coil is connected to an appropriate motor drive output to form a "delta" configuration. As with the control 2 and control 3 lines in FIG. 3, the "control delta" and "control wye" control lines can be diode-coupled to preclude asserting both at the same time.

Figure 10:
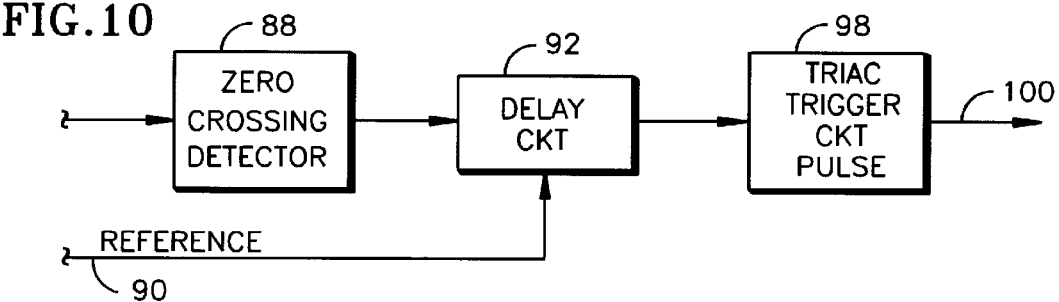
FIG. 10 shows a zero crossing detector circuit, according to the present invention.
Figure 11:
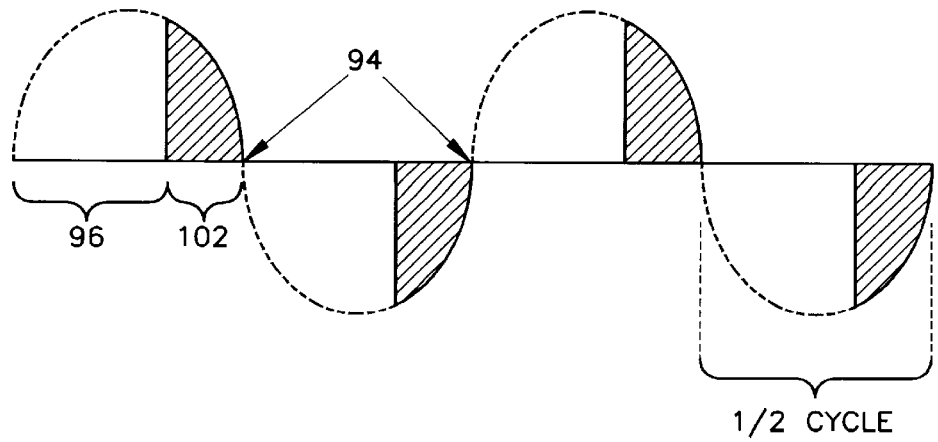
FIG. 11 shows the circuit of FIG. 10 used to achieve phase angle modulation, according to the present invention.

Also, as an additional improvement, a "zero crossing detector" circuit 88, such as shown in FIG. 10, can be added along with a comparator to each of the TRIAC switches in order to permit a continuously-variable thrust to be developed in the LIM by a technique commonly known as "phase-angle modulation". This technique turns the TRIAC "on" for only a portion of each half-cycle of the AC line cycle, e.g., 120 times per second for a 60 Hz AC line. The TRIAC remains in conduction until the end of the half-cycle, at which time it turns "off" until triggered again in the following half-cycle. The earlier within the half-cycle that the TRIAC is triggered, the longer the TRIAC remains "on", producing greater amounts of thrust from the LIM. The switching point is determined by a reference signal 90 relative to either a time delay 92 following the zero crossing of the AC line, or a voltage level of the AC line (for conduction angles greater than 90 degrees) following the zero crossing. This variable LIM thrust is obtained in either direction by switching the phasing of two of the LIM phases as before. The "phase-angle modulation" technique provides for a smoother closed loop control of the door motion profiles, at some increase in complexity, than the other techniques described above.

The control circuit of FIG. 10 comprises the zero crossing detector 88 that senses when each half cycle of the AC line reaches a level near zero volts, as shown at points 94 of FIG.

11 (the zero crossing point). This starts a delay circuit 92, which will generate a delay (shown as a delay angle 94 in FIG. 11) based upon the reference input on the line 90 supplied by the elevator controller (not shown), the computer control strategy 10 or the like. After the delay period is over, a TRIAC trigger circuit 98 will generate a trigger pulse 100 that turns the TRIAC on to a conducting state 102 so that the voltage is not applied to the motor during the delay period 96, and voltage is applied to the motor during the conduction period 102. A separate control circuit is required for each of the three AC line phases. As the motor drive varies the reference input to the delay circuit, the control circuit varies the delay angle and hence the delay period 96, changing the average voltage applied to the motor and thus varying the motor output. As the delay (and therefore the delay angle) increases, the conduction angle is reduced, resulting in a lower average voltage applied to the motor and lower thrust or force output. Conversely, decreasing the delay results in a higher average voltage and greater motor output.

Although the invention has been shown and described with respect to a best mode embodiment thereof, it should be understood by those skilled in the art that the foregoing and various other changes, omissions and additions in the form and detail thereof may be made therein without departing from the spirit and scope of the invention.

We claim:

1. A linear induction motor (LIM) control for providing drive current for driving a LIM according to a control strategy for moving an elevator door, characterized in that said LIM control is responsive to alternating current (AC) at a fixed frequency as provided by a public utility, that said LIM control comprises a plurality of switches connected at inputs thereof directly to said AC and at outputs thereof directly to phase windings of said LIM, that said switches are responsive to control signals provided according to said control strategy for switching said phase windings to constantly accelerate said door at full thrust for a door open or close sequence until a first reference position is reached by said door and then constantly decelerating said door at full thrust until a second reference position is reached corresponding to a substantially full open or closed door.

2. The LIM control of claim 1, further characterized in that said switches are TRIAC switches.

3. The LIM control of claim 1, further characterized in that said fixed frequency is 50 or 60 Hertz.

4. The LIM control of claim 1, further characterized in that said LIM comprises a primary mounted on said elevator and a two-part secondary comprising a steel plate first part mounted opposite the primary of said LIM also mounted on said elevator and a copper sheet second part mounted on said door and interposed between said primary and said steel plate.

5. The LIM control of claim 1, further characterized in that said control strategy is for alternately reversing two of said phase windings to correspondingly accelerate and decelerate said door at full thrust.

6. The LIM control of claim 1, further characterized in that said switching is selected to occur between a starting point from which said door is constantly accelerated to a switching point from which said door is kept at a substantially constant velocity to a second switching point corresponding to said first reference position from which said door is constantly decelerated to said second reference position.

7. The LIM control of claim 1, further characterized in that said LIM control comprises an additional plurality of switches connected to said phase windings for connecting said phase windings in a delta or wye configuration in response, respectively, to a delta or wye control signal, for selectively switching said configuration in order to accelerate and decelerate said door at a selected one of two distinct thrust levels.

8. The LIM control of claim 1, wherein each of said plurality of switches is further characterized by
   a zero crossing detector, responsive to said AC, for providing a zero crossing signal indicative of said AC having a zero magnitude;
   a delay circuit, responsive to said zero crossing signal and to a reference signal having a magnitude indicative of a selected delay after detection of said zero magnitude, for providing a delay output signal for switching one of said plurality of switches.

9. The LIM control of claim 1, wherein said plurality of switches are responsive to said control signals for switching said phase windings to decelerate said door either at said full thrust or by coasting at zero thrust.

* * * * *